US007833320B2

(12) United States Patent
Diebold et al.

(10) Patent No.: US 7,833,320 B2
(45) Date of Patent: Nov. 16, 2010

(54) METHOD AND APPARATUS FOR A SELF-CLEANING FILTER

(75) Inventors: James P. Diebold, Lakewood, CO (US); Arthur Lilley, Finleyville, PA (US); Kingsbury Browne, III, Golden, CO (US); Robb Ray Walt, Aurora, CO (US); Dustin Duncan, Littleton, CO (US); Michael Walker, Longmont, CO (US); John Steele, Aurora, CO (US); Michael Fields, Arvada, CO (US)

(73) Assignee: Community Power Corporation, Littleton, CO (US)

( * ) Notice: Subject to any disclaimer, the term of this patent is extended or adjusted under 35 U.S.C. 154(b) by 1163 days.

(21) Appl. No.: 11/427,221

(22) Filed: Jun. 28, 2006

(65) Prior Publication Data

US 2007/0017859 A1 Jan. 25, 2007

Related U.S. Application Data

(60) Provisional application No. 60/694,156, filed on Jun. 28, 2005.

(51) Int. Cl.
*B01D 46/00* (2006.01)
(52) U.S. Cl. .............................. 95/282; 55/283; 55/299; 55/300; 55/304
(58) Field of Classification Search ............. 55/379, 55/380, 490, 501, 511, 529, 492, 283, 299, 55/300, 304, 305, 295, 293; 210/342, 417, 210/451, 455, 489, 498, 104, 106, 121, 356, 210/409, 416.1, 437; 137/41, 547; 95/282, 95/279
See application file for complete search history.

(56) References Cited

U.S. PATENT DOCUMENTS 3,520,649 A     7/1970  Tomany et al.
3,653,189 A *   4/1972  Miyake et al. ............... 55/288

(Continued)

OTHER PUBLICATIONS

Bui, T., et al., "Multi-stage Reactor for Thermal Gasification of Wood,"Energy vol. 19, No. 4, Elsevier, 1994, pp. 397-404.

(Continued)

*Primary Examiner*—Duane Smith
*Assistant Examiner*—Minh-Chau Pham
(74) *Attorney, Agent, or Firm*—Townsend and Townsend and Crew LLP

(57) ABSTRACT

A method and apparatus for removing fine particulate matter from a fluid stream without interrupting the overall process or flow. The flowing fluid inflates and expands the flexible filter, and particulate is deposited on the filter media while clean fluid is permitted to pass through the filter. This filter is cleaned when the fluid flow is stopped, the filter collapses, and a force is applied to distort the flexible filter media to dislodge the built-up filter cake. The dislodged filter cake falls to a location that allows undisrupted flow of the fluid after flow is restored. The shed particulate is removed to a bin for periodic collection. A plurality of filter cells can operate independently or in concert, in parallel, or in series to permit cleaning the filters without shutting off the overall fluid flow. The self-cleaning filter is low cost, has low power consumption, and exhibits low differential pressures.

17 Claims, 5 Drawing Sheets

U.S. PATENT DOCUMENTS

| | | | |
|---|---|---|---|
| 3,841,851 A | 10/1974 | Kaiser | |
| 4,011,059 A | 3/1977 | Daly et al. | |
| 4,184,437 A | 1/1980 | Mallek et al. | |
| 4,191,114 A | 3/1980 | Saitoh et al. | |
| 4,213,404 A | 7/1980 | Spaulding | |
| 4,278,064 A | 7/1981 | Regueiro | |
| 4,463,686 A | 8/1984 | Premel | |
| 4,481,022 A | 11/1984 | Reier | |
| 4,498,909 A | 2/1985 | Milner et al. | |
| 4,552,655 A | 11/1985 | Granot | |
| 4,583,992 A | 4/1986 | Rogers | |
| 4,599,953 A | 7/1986 | Gould | |
| 4,600,415 A | 7/1986 | Barton | |
| 4,643,110 A | 2/1987 | Lisowyj et al. | |
| 4,655,968 A | 4/1987 | Queiser et al. | |
| 4,750,437 A | 6/1988 | Rouse | |
| 4,871,014 A | 10/1989 | Sulzberger | |
| 4,881,949 A | 11/1989 | Brungel et al. | |
| 5,059,404 A | 10/1991 | Mansour et al. | |
| 5,226,927 A | 7/1993 | Rundstrom | |
| 5,279,234 A | 1/1994 | Bender et al. | |
| 5,311,830 A | 5/1994 | Kiss | |
| 5,318,602 A | 6/1994 | Juch | |
| 5,322,534 A * | 6/1994 | Kaiser | 55/283 |
| 5,553,556 A | 9/1996 | Kruger | |
| 5,560,820 A | 10/1996 | Consolo | |
| 5,595,655 A | 1/1997 | Steiner | |
| 5,690,710 A | 11/1997 | Stephan | |
| 6,024,032 A | 2/2000 | Sharpe | |
| 6,182,584 B1 | 2/2001 | Gaudio | |
| 6,202,577 B1 | 3/2001 | Boguslavsky et al. | |
| 6,279,491 B1 | 8/2001 | Takahashi et al. | |
| 6,283,048 B1 | 9/2001 | Fujinami et al. | |
| 6,360,679 B1 | 3/2002 | Clarke | |
| 6,422,159 B1 | 7/2002 | Hunter | |
| 6,579,336 B1 * | 6/2003 | Duffy et al. | 55/490 |
| 6,647,903 B2 | 11/2003 | Ellis | |
| 6,991,665 B1 * | 1/2006 | Allen et al. | 55/379 |
| 2002/0069798 A1 | 6/2002 | Ellis | |
| 2003/0176884 A1 | 9/2003 | Berrada | |

OTHER PUBLICATIONS

Gumz, W., Fig. 26, Gas composition vs. temperature in a gas producer, from Gumz, W., Gas Producers and Blast Furnaces, Wiley, New York (1950), adapted from W. Horak, Z. Oester Ver. Gas-u. Wasserfachm, 74, No. 11-12, 1933, pp. 170-180.

Makunda, H.S., et al., "Gasifiers and combustors for biomass-technology and field studies," Energy for Sustainable Development vol. 1, No. 3, Sep. 1994, pp. 27-38.

Reed, T.B. et al., "Chapter 2: History, Current developments, and Future Directions," Handbook of Biomass Downdraft Gasifier Engine Systems, Solar Energy Research Institute, Golden, Colorado (Now National Renewable Energy Laboratory), Document No. SERI/SP-271-3022, DE88001135, Mar. 1988, UC Category: 245, pp. 6-8.

Reed, T.B. et al., "Chapter 4," Handbook of Biomass Downdraft Gasifier Engine Systems, Solar Energy Research Institute, Golden, Colorado (Now National Renewable Energy Laboratory), Document No. SERI/SP-271-3022, DE88001135, Mar. 1988, UC Category: 245, p. 22.

Reed, T.B. et al., "Chapter 5: Gasifier Designs," Handbook of Biomass Downdraft Gasifier Engine Systems, Solar Energy Research Institute, Golden, Colorado (Now National Renewable Energy Laboratory), Document No. SERI/SP-271-3022, DE88001135, Mar. 1988, UC Category: 245, pp. 30-47.

Agarwal, A.T., "Design Guide for Dust Collectors," Chem. Eng., Feb. 2005, p. 42-49.

Bergmann, L., "Beating the Baghouse Blues," Chem. Eng., Jan. 2001, pp. 65-67.

Chemical Engineering, "Fouling Strikes Out," Oct. 1999, p. 45-49.

Diebold, J.P. et al., "The BioMax® 15: the automation, integration and pre-commercial testing of an advanced down-draft gasifier and engine/gen set," cplpress Science Publishers, 2006, pp. 894-907.

Pell, M et al., "Gas-Solids Operations and Equipment," in Perry's Chemical Engineer's Handbook, 7th ed., McGraw-Hill, pp. 17-47.

Reed, T.B., et al., "Handbook of Biomass Downdraft Gasifier Engine Systems," The Biomass Energy Foundation Press, Golden, CO., 1988, pp. 37-45.

Reed, T.B., et al., "Superficial Velocity—The Key to Downdraft Gasification," presented at the 4th Biomass Conference of the Americas, Oakland, CA, Aug. 29, 1999, pp. 1-9.

Rohsenow, W.M., et al., Handbook of Heat Transfer, McGraw-Hill, NY, 1998, pp. 17.2-17.7.

www.klarex.com, Klarex® Technology -self-cleaning heat exchangers, printed Jun. 16, 2005, 9 pages.

* cited by examiner $P_1 > P_2$ $P_1 \gg P_2$

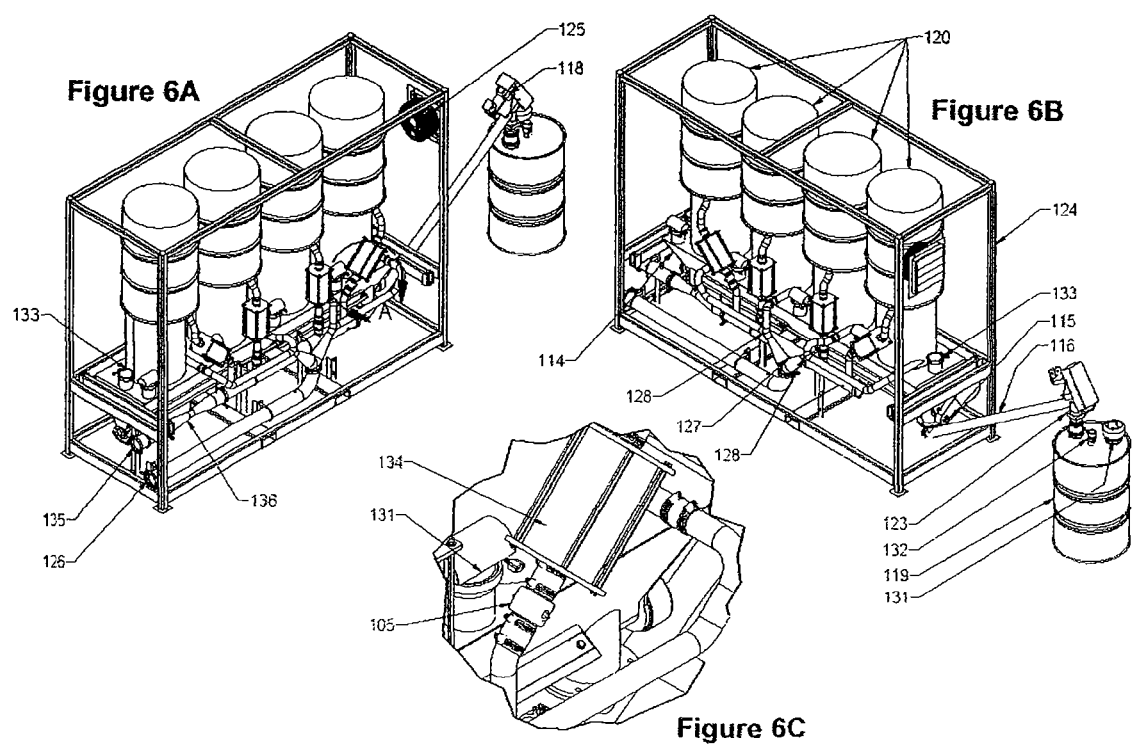

METHOD AND APPARATUS FOR A SELF-CLEANING FILTER

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of SBIR Contract No. DE-FG02-03ER83630 and SMB Contract No. ZDH-9-29047-01, both awarded by the U.S. Department of Energy.

CROSS-REFERENCES TO RELATED APPLICATIONS

This application claims the benefit of U.S. Provisional Application No. 60/694,156, filed Jun. 28, 2005. This application is also related to U.S. patent application Ser. No. 11/427,231, filed Jun. 28, 2006. The entire contents of each of these applications are incorporated herein by reference.

BACKGROUND OF THE INVENTION

Embodiments of the present invention relate to a filter apparatus and method, and more particularly to self-cleaning filters for removing relatively fine particulate material from a fluid stream.

Many fluid streams contain particulate matter, and it is often desirable to separate this particulate matter from the fluid stream. If not separated, the particulate matter may degrade product quality, efficiency, reduce performance, or even cause severe damage to components within the system.

Many types of filters have been designed for the purpose of removing particulate matter from fluid streams. Such filters have typically included a filter element designed to screen the particulate material. However, the particulate material often becomes entrapped in the filter element. As the quantity of particulate material, often referred to as filter cake, collects on the filter element, the pressure drop that occurs across the filter element increases. A pressure drop across the filter element of sufficient magnitude can significantly reduce fluid flow at which point the filter element must be periodically cleaned, or replaced with a new filter. Often, this is done manually by removing the filter element and cleaning the filter before reinstalling it back in the system. Manual cleaning is a time consuming operation as it involves significant disassembly and re-assembly. It also requires taking the process off line. Manual cleaning can also be a dirty one, with the potential for dislodging hazardous, or toxic, particles that can be inhaled or ingested. It can also be a dangerous operation, if the fluid is flammable or toxic.

To minimize manual operations, filters have been designed to accomplish continuous self-cleaning. However, filters that use back pulsing to dislodge materials or blades to scrape off caked particulate are often very intricate and costly mechanisms. Some filters are cleaned with sprayed fluids, such as water or air to remove the particulates often resulting in the need to dispose of a large fluid volume of contaminated, hazardous matter. Moreover, many current approaches require extreme pressures or forces to dislodge caked particulate from the filter.

What is needed are filter systems and methods that do not generate unwanted hazardous matter, and that able to remove particulates from a fluid stream in a way that is relatively simple, reliable, flexible, easy to manufacture, that supports long-term operation, is easy to maintain, and is self-cleaning. Relatedly, there continues to be a need for filters that can be operated as one of a plurality of filters, and that can operate either independently of other filters or in concert with other filters. Embodiments of the present invention address at least some of these needs.

BRIEF SUMMARY OF THE INVENTION

Embodiments of the present invention provide techniques for removing filter cake from a filter media in a very gentle and efficient manner. Moreover, embodiments are well suited for use in rural areas, as well as in developing countries, and often do not involve or minimize dependence upon outside power sources. These approaches minimize the need for repair and maintenance of such ancillary equipment. In some embodiments, filters provide a large surface area available for filtering that increases and does not make contact with any solid surface during filtration, thus making all of the filter's surface area usable. Filter embodiments provided herein often require no bag supports, scrapers, brushes, or nozzles to dislodge the filter cake.

In a first aspect, embodiments of the present invention encompass a process for removing a particulate from a fluid stream. The process includes flowing a fluid stream containing a particulate through a fluid permeable, flexible filter, expanding the filter and depositing the particulate on an interior surface of the expanded filter, discontinuing the flow of the fluid stream through the filter, collapsing the filter to distort the interior surface, and dislodging the particulate from the distorted interior surface of the filter. In some cases, expanding the filter can include creating or increasing a pressure differential across the filter. Collapsing the filter can include removing or reducing the pressure differential across the filter. In some cases, expanding the filter can include extracting an energy from the fluid stream and storing the energy in a mechanical form. Collapsing the filter can include releasing the stored mechanical energy. In some aspects, flowing the fluid stream includes controlling the fluid stream with a fluid control means disposed upstream of the filter. In some aspects, flowing the fluid stream can include controlling the fluid stream with a fluid control means disposed downstream of the filter. The fluid control means can include, for example, a valve, a pump, a compressor, or a blower.

In another aspect, embodiments of the present invention encompass a self-cleaning filter apparatus for removing a particulate from a fluid stream. The filter apparatus can include a fluid-permeable, flexible filter having an expanded state and an inverted state. The expanded state can be adapted to capture the particulate on an interior surface of the filter when receiving the fluid stream therethrough, and the inverted state can be adapted to dislodge the particulate from the interior surface. The apparatus can also include a force means configured to apply a force to the filter sufficient to convert the filter from the expanded state to the inverted state. In some cases, the force means is configured to extract an energy from the flowing fluid stream as it passes through the filter, to store the energy in a mechanical form, and to release the stored mechanical energy to apply the force to the filter. The filter can be coupled with a tube sheet. In some cases, the filter is free of any physical support structure, other than a tube sheet or a force means. In some cases, the force means can include a spring, a cable, a bladder, a weight, and the like. The force means can be coupled with an upstream side of the filter, a downstream side of the filter, or an upstream side of the filter and a downstream side of the filter. The filter can include a membrane surface that is difficult for the particulate to adhere.

In still another aspect, embodiments of the present invention encompass a method for removing a particulate from a fluid stream. The method can include flowing the fluid stream through a first self-cleaning fluid filter to capture a first portion of the particulate from the fluid stream, stopping the fluid stream flow through the first fluid filter while flowing the fluid stream through a second self-cleaning fluid filter to capture a second portion of the particulate from the fluid stream, discharging the first captured portion of particulate from the first fluid filter, stopping the fluid stream flow through the second filter, and discharging the second captured portion of particulate from the second fluid filter. In some cases, the first and second captured portions of particulates are discharged continuously, semi continuously, or non-continuously. The method can also include identifying an unclean self cleaning fluid filter with a differential pressure sensor. The method can also include determining a frequency of a cleaning cycle with a differential pressure sensor. In some cases, discharging a first captured portion of particulate from a first fluid filter includes collapsing the first fluid filter to distort an interior surface thereof. In some cases, discharging a first captured portion of particulate from a first fluid filter includes applying a force to the fluid filter sufficient to convert the fluid filter from an expanded state to an inverted state. Method embodiments may also include flowing the fluid stream through a third self-cleaning fluid filter to capture a third portion of the particulate from the fluid stream, coordinating operation of the first, second, and third self-cleaning fluid filters, and executing a cleaning cycle that involves only a portion of the first, second, and third self-cleaning fluid filters.

In another aspect, embodiments of the present invention provide a process for removing a particulate from a fluid stream. The process can include controlling the flow of a fluid containing particulates through a fluid permeable, flexible filter, depositing the particulates on the interior surface of the expanded filter, and expanding the filter by creating a pressure differential across the filter. The process can also include extracting energy from the flowing fluid stream and storing the energy in a mechanical form, controlling the release of the stored mechanical energy so as to apply a collapsing force on the filter, collapsing the filter such that interior surfaces face outward by reducing the pressure differential and applying a collapsing force to the filter, distorting the filter during the collapse to dislodge the deposits of the particulates, and removing the dislodged particulates. In some aspects, the flow of fluid is controlled by a valve located on the inlet piping, the outlet piping, valves located on both the inlet and the outlet of the piping, pumps, compressors, or blowers.

In one aspect, embodiments of the present invention provide a self-cleaning, inflatable filter for removing particulates from a fluid stream. The apparatus can include, a fluid-permeable, flexible filter attached to a tube sheet or bulkhead, such that a fluid containing particulates is forced to flow through the filter. The apparatus can also include means to cause the fluid containing the particulates to flow through the filter such that fluid pressure expands the filter outward in the downstream direction, and means to deposit the particles on the interior surfaces of the outwardly expanded filter. The filter can have material properties to withstand the stresses generated by expansion and collapsing forces acting on the filter. The filter can also be free of any physical support structure during expansion other than its attachment to the tube sheet. The filter can also be free of physical support during collapse, other than its attachment at the tube sheet. In some cases, the apparatus also includes means to extract energy from the flowing fluid stream and to store the energy in a mechanical form, and means to release the stored mechanical energy to apply a collapsing force to the filter in a direction opposite the direction of the flowing fluid and sufficient to collapse the filter into an inverted state. The force acting to distort the flexible filter is typically sufficient to dislodge the deposited particulates. The apparatus can also include a container to receive the particulates dislodged from the filter and to store the particulates in a manner so as not to disturb the flow of the fluid, and means to remove the dislodged particulates from the container. In some aspects, the means to apply force, or forces, acting on the filter include one or more springs, cables, bladders or weights. In some aspects, the force means is attached with an upstream side of the filter, a downstream side of the filter, or both. The force acting on the filter can be on the upstream side of the filter, the downstream side of the filter, or on both sides of the filter simultaneously. The dislodged particulate can be removed from the filter housing continuously, semi-continuously, or non-continuously. The semi-permeable filter material can include a membrane to filter out extremely small particles while providing a surface that is difficult for particles to adhere.

In still another aspect, embodiments of the present invention provide a system for removing particulates from a fluid stream. The system can include multiple self-cleaning fluid filters arranged to allow continuous filtering operation by reducing the flow of fluid to a fraction of the filters, allowing the fraction of the filters to self-clean, and then returning flow to the fraction of cleaned filters. In some cases, a single filter can be taken off line by stopping fluid flow through the filter. In some cases, two, or more, the filters can be taken off line by stopping fluid flow through the filters. The dislodged particulate can be removed from the multiple filters continuously, semi-continuously, or non-continuously. In some cases, the system includes one or more differential pressure sensors to determine the pressure drop across the filter, which can be used to determine the frequency of the cleaning cycle. In some cases, more than two filters are operated as a unit and are put through cleaning cycles that involve only a fraction of the filters at a time.

For a fuller understanding of the nature and advantages of the present invention, reference should be had to the ensuing detailed description taken in conjunction with the accompanying drawings.

BRIEF DESCRIPTION OF THE DRAWINGS

FIGS. 6A and 6B illustrate a four-filter module according to embodiments of the present invention.

FIG. 6C shows a close-up of a safety filter according to embodiments of the present invention.

DETAILED DESCRIPTION OF THE INVENTION

Figure 2:
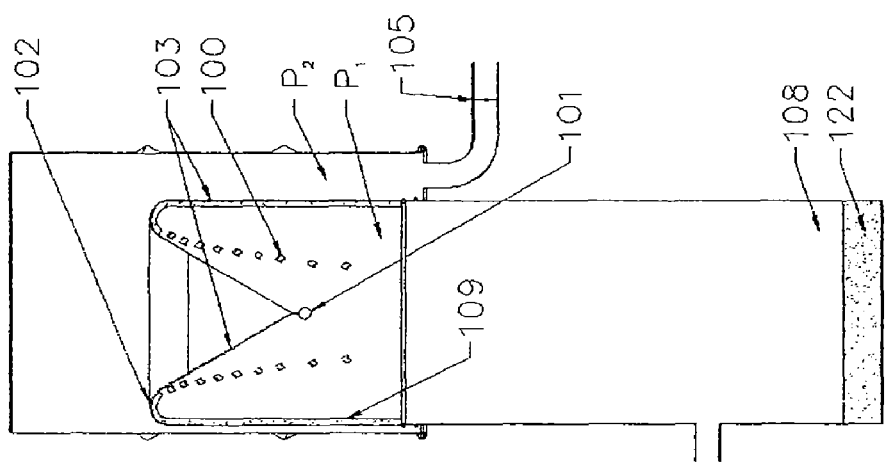
FIG. 2 illustrates a vertical section of a single filter having a partially deflated filter bag and accumulated particulates falling to the bottom of the chamber according to embodiments of the present invention.

Embodiments of the present invention encompass systems and methods that allow an inflated filter to slowly deflate and to gently turn itself inside out after the flow of fluid is significantly reduced or eliminated completely.

Some current filter techniques rely upon water scrubbing to remove residual fine particles from fluids such as hot gases. Typically, the water used for scrubbing is in the form of a mist. Unfortunately, these scrubbing mists can be themselves difficult to remove from the fluid stream. The use of water scrubbing may also create a waste-water disposal problem. Coalescing filters are often used to remove these fine materials and mists by Brownian motion, but can introduce a significant, undesirable pressure drop to the system. In some cases the captured particles may not be washed off the coalescing filter by the captured mists, and the coalescing filters may require periodic service to remove the captured particles, or the coalescing filters may need replacement.

Some current approaches use either cloth filters supported by an open structure or cage, or cloth filters that are unsupported and inflated by the pressure differential across them. Filtering with unsupported filter media often uses mechanical shaking of the filter bag to dislodge the filter cake after stopping fluid flow to the filter bag; however, this mechanical shaking can be inefficient and the filters may tend to plug more often. The mechanical shaking can introduce stresses in the filter media due to the whipping action imparted. Static sand filters often have a problem with cleanup, since the particles removed are embedded in the sand, and the volume of material to be removed is substantially greater than the volume of particulates captured. Sand filters with the potential for periodic back flushing typically involve relatively complicated piping and valving. Centrifugal separators for removing smaller, lighter weight particles can be exceedingly complex, and power intensive. In addition to a substantial initial investment, operating and maintenance costs can be quite high for a centrifugal filtration apparatus.

In some current approaches, a longitudinal filter bag is prevented from fully collapsing by a central, axial support, thereby preventing the full cleaning or cleaning of particles from a range of liquids. Such systems are complex and costly. Some approaches involving a bag support may involve a filter area in contact with a solid surface, thus decreasing the filtering function. Moreover, some current bag supports do not provide sufficient bag distortion to adequately loosen and dislodge filter cake, which may be problematic when filtering very fine particles or sticky particles that are difficult to remove from the filter surface. Other current approaches require a scraper, brush, or pressurized fluid to dislodge accumulated filter cake. In some approaches, pulses of pressurized fluid are back pulsed through one or more of the bags to reverse the fluid flow through the bag and dislodge the accumulated filter cake. Such back pulsing can harm filter elements, and the ingress of an oxidizing agent is hazardous if the pulsed fluid is combustible.

Embodiments of the present invention provide filters that use no bag supports, scrapers, brushes, or nozzles to dislodge the filter cake. In some cases, the surface area available for filtering increases as the bag is expanded and it does not make contact with any solid surface support during filtration, making all or most of the filter's surface area usable. Fluid flow can be through the open end of a bag and out through a fabric. Embodiments provided herein are well suited for use in rural areas, as well as in developing countries. Filter system embodiments of the present invention can have minimal need for equipment such as back pulsing pumps, rate controllers, and air compressors. They may have little or no dependence upon outside power sources. These approaches to remove the filter cake from the filter media are typically very gentle and efficient. Filter embodiments of the present invention are well suited for use with biomass power generation systems and methods, such as those described in commonly owned U.S. patent application Ser. No. 11/427,231, filed Jun. 28, 2006 ("Method and Apparatus for Automated, Modular, Biomass Power Generation,"), the entire contents of which are incorporated herein by reference.

Figure 1:
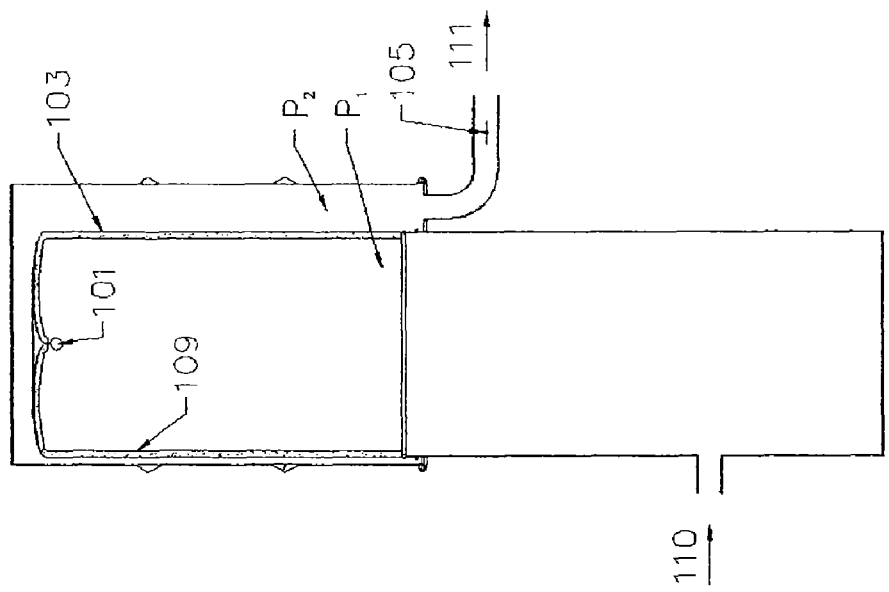
FIG. 1 illustrates a vertical section of a single filter having a fully inflated filter bag according to embodiments of the present invention.

Turning now to the drawings, FIG. 1 illustrates a vertical section of a single filter having a fully inflated filter bag according to embodiments of the present invention. A weight 101 is attached to the inside center of a closed end of a bag 103. A flowing fluid 110 with entrained particulates enters the filter housing, for example via an input or entry piping, below the inflated filter bag 103 and travels in an upward direction. Flowing fluid 110 passes through the filter bag 103 and exits as a clean fluid 111, for example through an exit or outlet piping. In some embodiments, weight 101 is light enough to allow the filter bag 103 to inflate with a modest pressure differential ($dP=P_1-P_2$), but heavy enough to ensure that the bag turns itself inside out in a symmetric manner during deflation as shown in FIG. 2, rather than falling off to one side. FIG. 2 illustrates a vertical section of a single filter having a partially deflated filter bag and accumulated particulates falling to the bottom of the chamber according to embodiments of the present invention.

Figure 3:
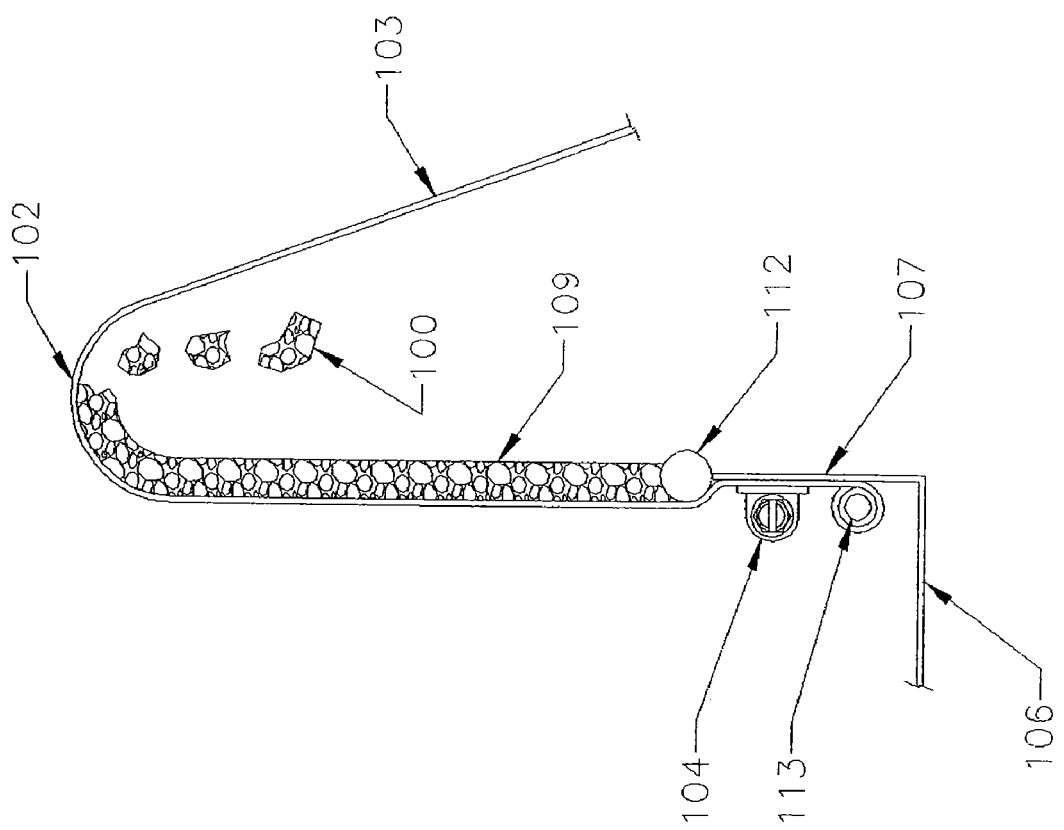
FIG. 3 shows a vertical section of a filter depicting distortion of a filter bag during deflation and removal of accumulated particulates according to embodiments of the present invention.
Figure 4:
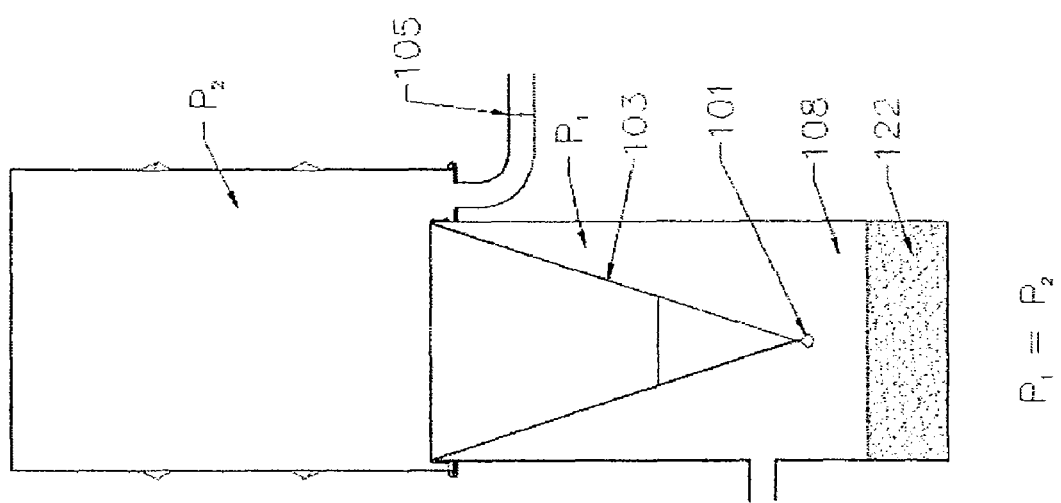
FIG. 4 shows a vertical section of a single filter having a fully deflated, cleaned filter bag and a shed particulate material in a location for easy removal according to embodiments of the present invention.

FIG. 3 shows a vertical section of a filter depicting how the distortion of the filter bag during deflation is able to remove accumulated particulates. A curved upwardly facing shape 102, which may include a region of maximum or extreme filter distortion, can form at the top edge of the bag upon deflation. The curved region of maximum filter distortion will travel slowly downward until the bag has fully deflated as shown in FIG. 4. As the region of maximum filter distortion 102 encounters new supplies of deposited particulate 109, the deformation of the filter surface is sufficient to dislodge accumulated particulate 100 from the bag surface.

In one non-limiting embodiment, a five-pound (2.3 kg) weight is used with an 18-inch diameter filter bag. This weight may include a single or multiple objects for each filter bag. Although FIG. 2 shows the weight 101 hanging from the inner, upstream, side of the bag, it may also be attached to the outer, downstream side of the bag. Other non-limiting embodiments would use a spring or cable to apply deflating force or forces to the filter bag.

To deflate the filter bag for cleaning, a valve 105 in the exit piping is closed thereby stopping flow of the fluid 110 eliminating the inflation forces resulting from the differential pressure across the bag 103. Alternatively, the valve may be placed in the inlet piping, or in both the inlet and the outlet piping. As shown in FIG. 2, when the downstream pressure $P_2$ approaches $P_1$, the weight 101 pulls the filter downwardly, the deflating filter is turned inside out, and the filter cake 109 is dislodged. The falling dislodged filter cake 100 falls to a location 108 that is free from disturbance by the flow of fluid that resumes when valve 105 is later re-opened. The accumulated, dislodged filter cake 122 accumulates in the bottom of the filter housing 108.

Non-limiting examples of the exit valve 105 include ball valves, gate valves, and the like. Inexpensive butterfly valves are adequate to create the desired deflation. The seal in the valve 105 may allow some leakage of the fluid and still deflate the filter bag sufficiently for cleaning.

The dislodging of the filter cake is shown in more detail in FIG. 3. As the filter bag is flexed and turned inside out, the filter cake 109 is deformed and broken up. The broken pieces of filter cake 100 fall from the bag 103. Also shown in FIG. 3 in more detail is the external lip 112 formed by a tube or rod welded to the short cylinder 107, which in turn is welded to the tube sheet 106. Alternatively, the lip could be formed by swaging the top of the short cylinder 107. The external lip 112 on the short cylinder 107 prevents the band clamp 104 from easily sliding off. In addition, a thick drawstring 113 in the filter bag aids in installation of the band clamp 104 and further aids in preventing the bag from easily slipping under the band clamp 104 and off the short cylinder 107. The combination of the external lip 112 and the thick draw string 113 provide for a very secure attachment of the filter bag 103 to the tube sheet 106, without excessive tightening of the band clamp 104 that could damage the filter bag.

Figure 5:
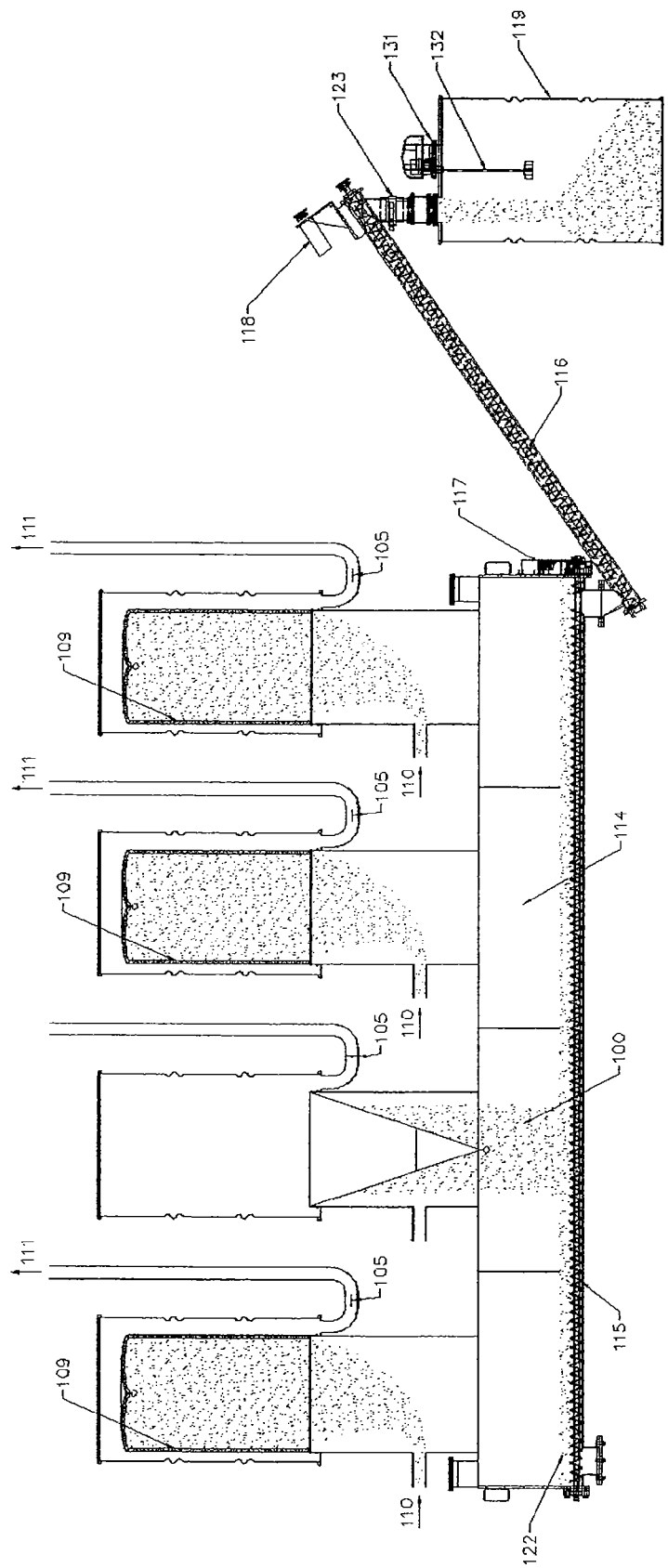
FIG. 5 illustrates a vertical section of four filters showing three on-line accumulating particulates, a fourth off-line for cleaning, and particulates being removed to an external repository according to embodiments of the present invention.

FIG. 4 shows a vertical section of a single filter having a fully deflated, cleaned filter bag and the shed particulate material in a location for easy removal. After a suitable time interval to allow the bag to fully deflate, the pressure on the inside, upstream side of the bag $P_1$ is about equal to the pressure on the outside, downstream side of the bag $P_2$. Then, the valve 105 is opened and fluid flow started through the cleaned bag to inflate it again, as shown in FIG. 1. Then another one of a series of filter bags is taken off line as shown in FIG. 5 by shutting its valve to deflate it to remove its accumulated char cake. FIG. 5 shows a vertical section of four filters having three on-line accumulating particulates, a fourth off-line for cleaning, and particulates being removed to an external repository. Upon cleaning, the filter is returned to service. This sequence is repeated with each filter bag, so that all filter bags are periodically cleaned. During the cleaning cycle, the filters not being cleaned are available for process filtering. FIG. 5 also shows that after the filter cake 109 is dislodged from the filter bag 103, it falls into a common bin 114, where the recovered particulate material 122 may be removed intermittently or continuously with a series of augers 115 and 116 (or other conveying device) that are rotated by motors 117 and 118 respectively. The particulate is removed to a drum 119 for disposal or sale. By temporarily stopping the augers 115 and 116 and closing valve 123, the particulate storage drum 119 may be removed from the system without interrupting the flow of fluid through the system. After a new particulate storage drum is installed, the valve 123 is opened and the augers 115 and 116 restarted to remove the accumulated particulates.

The filter media in a non-limiting embodiment is a thin, flexible material that may have a membrane attached to its upstream surface to achieve relatively complete removal of even very fine particles. A non-limiting embodiment of this filter material has a PTFE membrane attached to a 6-oz/yd$^2$ woven polyester cloth. This slick, non-stick membrane provides extremely good filtration of very fine particles, which are held in place by the fluids passing through the accumulated filter cake. This filter material is rated at 135° C. (275° F.) for continuous duty and 149° C. (300° F.) for a maximum surge temperature. The filter cake has difficulty adhering to the slick surface of the membrane attached to the filter cloth, facilitating the removal of accumulated filter cake. Condensation of moisture on the filter media can severely blind the filter. To avoid this condensation of moisture, the filter housing can be fitted with electrical resistance heaters. These heaters maintain the filters above the dew point of the fluid to be filtered, as needed.

Multiple Filter Bags

Cleaning of the filter bags can lend itself to automatic control very easily, which can be based upon a timer, or upon the pressure differential across the filter. A non-limiting embodiment of this system uses five such filter bags, each of which are individually cleaned for ten minutes once every fifty minutes when the pressure drop exceeds a selected value. Embodiments of the present invention have been shown to deliver extremely clean gas from a biomass gasification system without the need for liquid scrubbing systems, e.g. <10 ppm tars and <1 ppm particulates after filtration, based on a gas sampling protocol as discussed in Diebold, et al. "The BioMax® 15: The Automation, Integration, and Pre-commercial Testing of an Advanced Down-Draft Gasifier and Engine/Gen Set," Proceedings of the Conference Science in Thermal and Chemical Biomass Conversion, A. V. Bridgwater, ed., Victoria, B. C. Aug. 30-Sep. 2, 2004, the contents of which are hereby incorporated by reference for all purposes.

FIGS. 6A and 6B illustrate a four-filter module, and FIG. 6C shows a close-up of a safety filter, according to embodiments of the present invention. Safety filters are useful for preventing or minimizing problems when an original filter ruptures. In some embodiments, each filter bag is 18 inches in diameter and 30 inches long. Multiple, cylindrical filters are employed so that the exiting fluid flow from each filter can be individually shut off by activating a suitable actuator to close a butterfly valve 105 and the accumulated filter cake is dislodged and removed automatically as shown in FIGS. 1-5. The upper filter housing surrounding each bag is an inverted 55-gallon drum 120. The entire filter assembly can be enclosed by insulated panels attached to supporting structures 124. Excessive heat in the insulated enclosure can be removed with a fan 125.

The filter bags often do not require periodic maintenance. However, in the event they need to be inspected, cleaned, or replaced, the 55-gallon drum 120 surrounding each filter bag can be easily removed with a drum clamp. The large diameter band clamp, holding the filter bag to the very short cylinder attached to the tube sheet, is then accessible and the bag can be readily removed.

The fluid with entrained particulate enters the system through a pipe 126 and is split into four streams by a primary tee or "Y" 127 and two secondary tees or "Y's" 128. Each stream enters tangentially into each of the cylindrical filter housings, below the filter bag. These tangential entries separate the larger particles from the fluid and the entrained smaller particles. This filter system employs cylindrical filters that are inflated by the pressure differential across the filter media. This unsupported filter-bag design can eliminate the need for expensive metal support structures, or cages, for the filter bags.

After the filter cake is dislodged from the filter bag, it falls into a common bin 114, where the recovered particulates may be temporarily stored, or intermittently or continuously removed with an auger system 115 and 116, through a valve 123 to fall into a drum 119 for disposal, use, or sale. Rupture disks 131 are located on the lid of drum 119 and also on the common bin 114 to relieve any excessive pressure, e.g., from an explosion, that could damage the equipment. A level sensor 132 on the lid of the drum 119 sends a signal to the operator that the drum is full. Inspection ports 133 using easily removed flanges (e.g., sanitary fittings) are located at each end of the common bin 114. Individual secondary or safety filters 134 are located downstream of each filter bag. The clean fluid exits the filter assembly at 135, after passing through a flow meter 136. A pair of pressure transducers or a differential pressure transducer monitors the pressure drop across the filter assembly. A safety filter may be located downstream of the filtering apparatus. In the event of a filter bag rupture, the safety filter will rapidly become blinded, effectively isolating and removing the ruptured filter bag from the process without allowing fines to pass downstream.

High Length to Diameter Ratio: Example

To increase the surface area for filtering, in some embodiments it can be advantageous to use many smaller diameter filter bags, rather than a single large diameter filter bag of the same length. To demonstrate the physical movement of this filter in a relatively smaller diameter, a 4-inch diameter filter bag by 30 inches long was fabricated of the same light-weight 6-oz/yd$^2$ filter material with a PTFE membrane, as was used for the 18-inch diameter by 30-inch long filter bags. A 1-lb weight was attached to the inside of the circular, closed end of the 4-inch diameter bag. This small diameter bag was attached to the outside of a long 4-inch metal tube with a worm-gear hose clamp. A large shop vacuum cleaner was used to blow air into the filter bag to inflate it and lift the weight. When the vacuum cleaner was shut off, the filter bag turned itself inside out in a manner similar to the larger diameter bag having the same length. The single, smaller diameter filter bag had a slight tendency to fall to one side before it completed its inside-out maneuver to end up inside the 4-inch diameter metal tube. In the application of multiple, smaller diameter filter bags in a cylindrical bag house, the bags can be clustered together and hold each other up to prevent each other from falling to one side, while they deflate and dislodge the filter cake. Thus, the use of relatively long filter bags to increase the filter surface area in a given size of filter housing is feasible with this self-cleaning concept.

Although certain system, device, and method embodiments have been disclosed herein, it will be apparent from the foregoing disclosure to those skilled in the art that variations, modifications, alternative constructions, and equivalents of such embodiments may be made without departing from the true spirit and scope of the invention. Therefore, the above description should not be taken as limiting the scope of the invention which is defined by the appended claims.

What is claimed is:

1. A process for removing a particulate from a fluid stream, comprising:
    flowing a fluid stream containing a particulate through a fluid permeable, flexible filter;
    expanding the filter by creating or increasing a pressure differential across the filter, wherein expanding the filter comprises extracting an energy from the fluid stream and storing the energy in mechanical form;
    depositing the particulate on an interior surface of the expanded filter;
    discontinuing the flow of the fluid stream through the filter;
    collapsing the filter by removing or reducing the pressure differential across the filter to convert the filter from the expanded state to an inverted state, wherein collapsing the filter comprises releasing the stored mechanical energy; and
    dislodging the particulate from the collapsing filter.

2. The process of claim 1, wherein flowing the fluid stream comprises controlling the fluid stream with a fluid control means disposed upstream of the filter, the fluid control means selected from the group consisting of a valve, a pump, a compressor, and a blower.

3. The process of claim 1, wherein flowing the fluid stream comprises controlling the fluid stream with a fluid control means disposed downstream of the filter, the fluid control means selected from the group consisting of a valve, a pump, a compressor, and a blower.

4. The process of claim 1, wherein the flowing the fluid stream comprises controlling the fluid stream with a first fluid control means disposed upstream of the filter and a second fluid control means disposed downstream of the filter, the first fluid control means and the second fluid control mean selected from the group consisting of a valve, a pump, a compressor, and a blower.

5. A self-cleaning filter apparatus for removing a particulate from a fluid stream, comprising:
    a fluid-permeable, flexible filter having an expanded state and an inverted state, the expanded state adapted to capture the particulate on an interior surface of the filter when receiving the fluid stream therethrough, and the inverted state adapted to dislodge the particulate from the interior surface;
    a force means configured to apply a force to the filter sufficient to convert the filter from the expanded state to the inverted state, wherein the force means is configured to extract energy from the flowing fluid stream as it passes through the filter, to store the energy in a mechanical form, and to release the stored mechanical energy to apply the force to the filter.

6. The apparatus of claim 5, wherein the filter is coupled with a tube sheet.

7. The apparatus of claim 6, wherein the filter is free of any physical support structure, other than the tube sheet and the force means.

8. The apparatus of claim 5, wherein the force means comprises one or more members selected from the group consisting of a spring, a cable, a bladder, and a weight.

9. The apparatus of claim 5, wherein the force means is coupled with an upstream side of the filter, a downstream side of the filter, or an upstream side of the filter and a downstream side of the filter.

10. The apparatus of claim 5, wherein the filter comprises a membrane surface that is difficult for the particulate to adhere.

11. A method for removing a particulate from a fluid stream, comprising:
    flowing the fluid stream through a first self-cleaning fluid filter;
    expanding the filter to capture a first portion of the particulate from the fluid stream, wherein expanding the filter comprises extracting an energy from the fluid stream and storing the energy in mechanical form;
    stopping the fluid stream flow through the first fluid filter while flowing the fluid stream through a second self-cleaning fluid filter to capture a second portion of the particulate from the fluid stream;
    discharging the first captured portion of particulate from the first fluid filter by applying a force to the fluid filter sufficient to convert the fluid filter from the expanded state to an inverted state, wherein applying a force to the fluid filter comprises releasing the stored mechanical energy;
    stopping the fluid stream flow through the second filter; and
    discharging the second captured portion of particulate from the second fluid filter.

12. The method of claim 11, wherein the first and second captured portions of particulates are discharged continuously, semi-continuously, or non-continuously.

13. The method of claim 11, comprising identifying an unclean self-cleaning fluid filter with a differential pressure sensor.

14. The method of claim 11, comprising determining a frequency of a cleaning cycle with a differential pressure sensor.

15. The method of claim 11, wherein discharging the first captured portion of particulate from the first fluid filter comprises collapsing the first fluid filter to distort an interior surface thereof.

16. The method of claim 11, further comprising:

flowing the fluid stream through a third self-cleaning fluid filter to capture a third portion of the particulate from the fluid stream;

coordinating operation of the first, second, and third self-cleaning fluid filters; and executing a cleaning cycle that involves only a portion of the first, second, and third self-cleaning fluid filters.

17. The method of claim 16, further comprising:

flowing the fluid stream through a fourth self-cleaning fluid filter to capture a fourth portion of the particulate from the fluid stream;

coordinating operation of the first, second, third, and fourth self-cleaning fluid filters; and executing a cleaning cycle that involves only a portion of the first, second, third, and fourth self-cleaning fluid filters.

\* \* \* \* \*